Dec. 13, 1938.                S. WISE                2,140,489
                            LOCK DEVICE
                        Filed Oct. 29, 1936        3 Sheets-Sheet 1
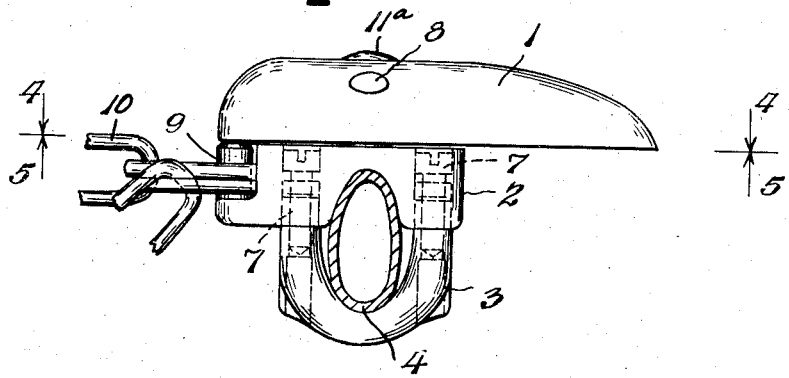
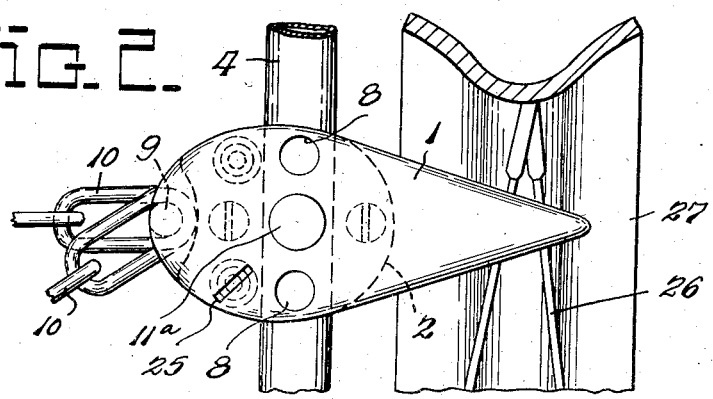
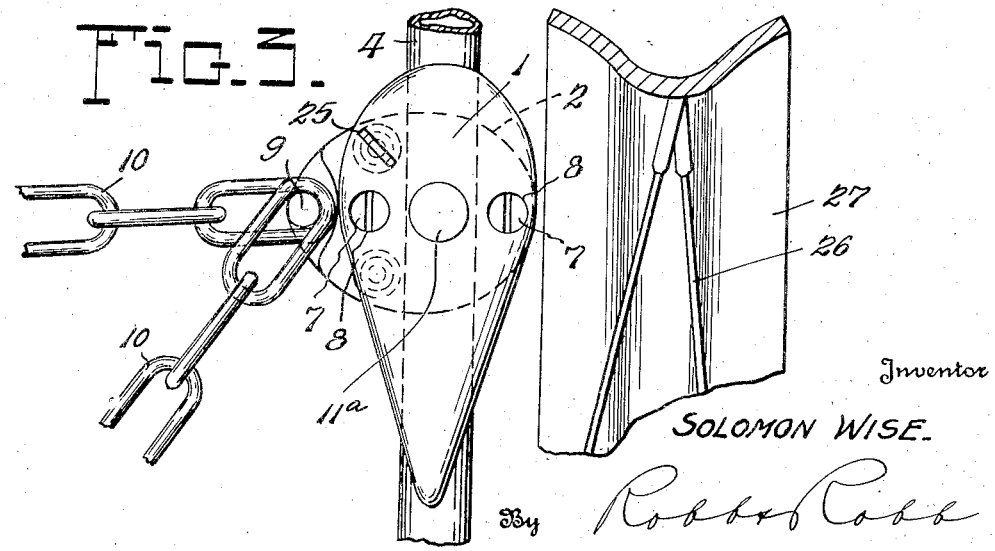
Inventor
SOLOMON WISE
By Robb & Robb
Attorneys

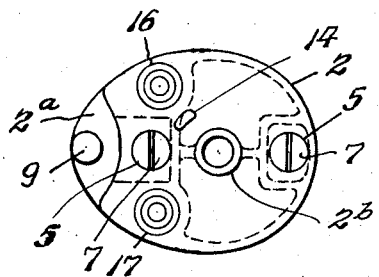
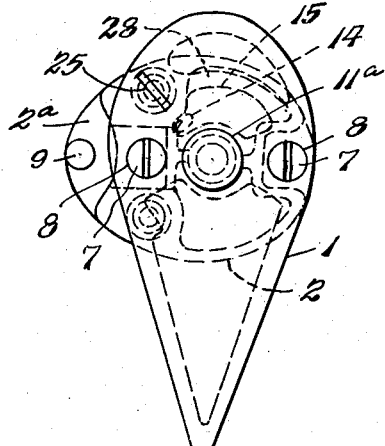
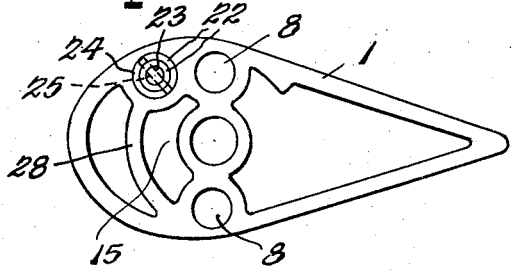
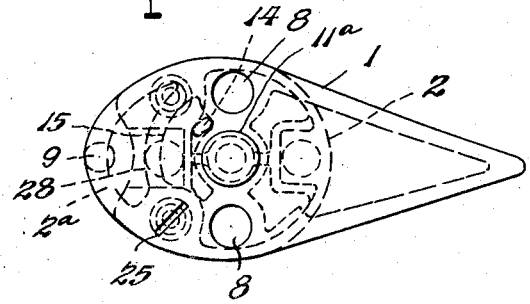
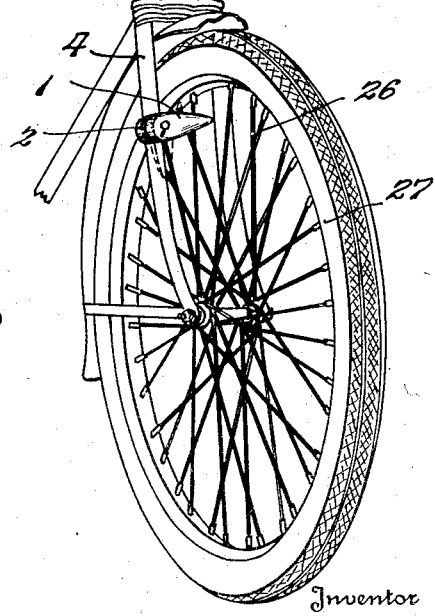

Dec. 13, 1938. S. WISE 2,140,489
LOCK DEVICE
Filed Oct. 29, 1936 3 Sheets-Sheet 3
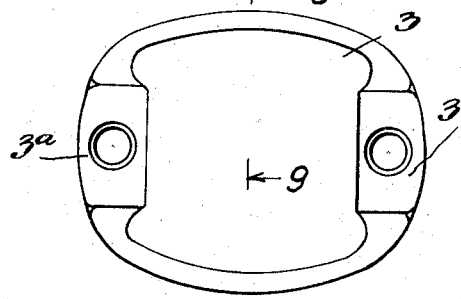
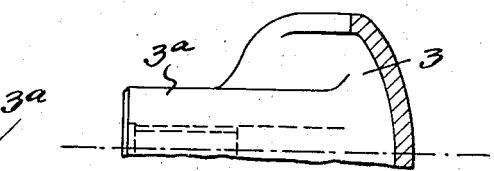
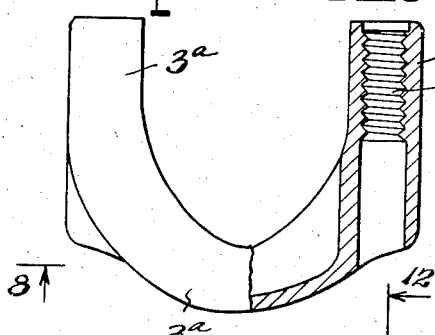
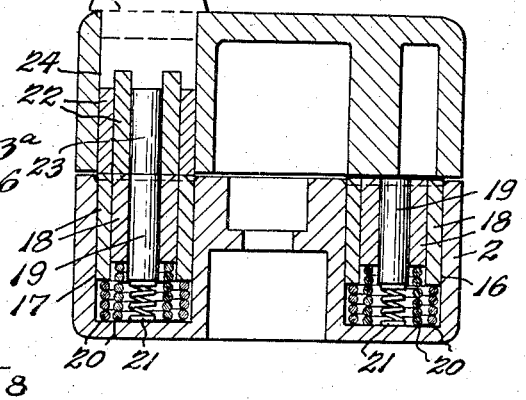
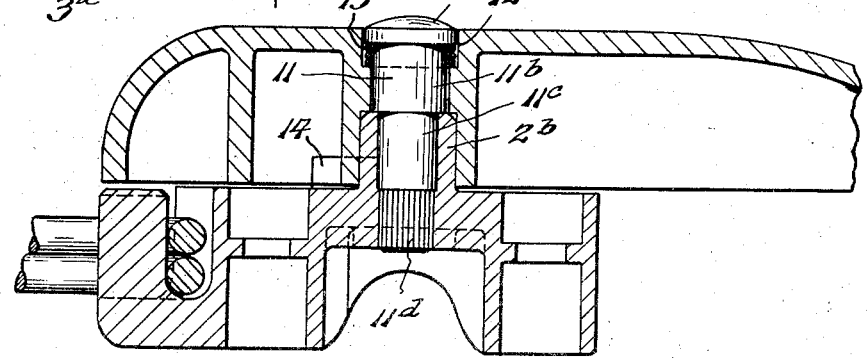
Inventor
SOLOMON WISE
By Robbs Cobb
Attorney Patented Dec. 13, 1938

2,140,489

UNITED STATES PATENT OFFICE 2,140,489

LOCK DEVICE

Solomon Wise, Shaker Heights, Ohio

Application October 29, 1936, Serial No. 108,256

3 Claims. (Cl. 70—50)

The object of this invention has been to produce a simple, compact, and double-acting type of lock particularly designed for bicycles, but adapted functionally for use for other purposes. The reference to double-acting made above has to do with the utility of the lock of the invention for dual purpose operation, as will later herein more fully appear. Thus my lock is designed for use in connection with a chain or similar connecting member adapted to encircle a post or similar object for the purpose of locking or tying to the said post or object, so to speak, a bicycle, or the like, which may carry the lock device. Furthermore, the locking member which cooperates to lock the chain or similar member to the bicycle and around a fixed part, in addition to its cooperation with the chain for preventing the unauthorized detachment thereof from the lock, is adapted to engage with the spokes of a wheel, when the locking member is in its locking position of adjustment.

Since my invention involves the use of a locking member necessarily adjustable to locking and unlocking positions, in other words operative or inoperative positions, an important feature of the invention lies in the provision of locking mechanism designed to lock said member in either of such positions. Thus it is not possible accidentally or unauthorizedly for any one to snap the locking member into a locking position so that the user, ignorant of the fact that the locking member has been placed in locking position, might operate the bicycle and cause damage thereto. The possibility of such result is obviated by the lock mechanisms provided for the locking member, when properly locked.

Certain novelty lies in the feature of my invention involving the construction of the lock mechanism so that it may be very quickly applied and permanently attached to a part of the bicycle. In this connection the locking member functions advantageously to the extent that when it is in its locking position removal of the lock as a unit is prevented, but when the locking member is adjusted to assume its unlocking position, the securing means by which the locking member is attached to the bicycle or similar part is rendered accessible so as to enable the application of the lock device, or its removal, as the situation requires.

The invention is susceptible of use, in reference to certain of the complemental parts thereof, for other purposes than as a bicycle lock. In other words, the base member and locking member features of my device are adapted to be applied, the base member to the jamb of a doorway or frame, and the locking member thereon operated so as to be movable into a position for locking a door closed or permitting its opening, as desired.

The invention involves certain other detail features of construction by way of novel assemblage of the parts of the lock device, as will be more fully presented hereinafter in conjunction with the accompanying drawings, in which—

Figure 1 is a top plan view of a lock device embodying the invention, showing the locking member in its locking position over the chain lug of the base, and also showing the chain ends held in place by the lug, said chain broken away.

Figure 2 is a view of the parts shown in Figure 1 as viewed in front elevation, illustrating the rim portion of a wheel with the lock member in spoke-engaging position relative to the spokes.

Figure 3 is a view similar to Figure 2, except that the lock member has been adjusted to assume its unlocking position.

Figure 4 is a plan view of the base of the lock, alone, illustrating two series of concentric tumblers or cylinders that form a part of the lock mechanism carried by said base, looking in the direction of the arrows 4—4 of Figure 1.

Figure 5 is a plan view of the lock member, looking toward its under-side and showing the one series of concentric tumblers or cylinders carried thereby and cooperable with the corresponding tumblers on the base shown in Figure 4, looking in the direction of the arrows 5—5 of Figure 1.

Figure 6 is a plan view of the lock member as when adjusted to its locking position and as when mounted on the base of Figure 4, the latter being shown in dotted lines in Figure 6.

Figure 7 is a view like that of Figure 6, except that the lock member has been turned to its unlocking position and re-locked after the key-operated locking mechanism is properly operated for this purpose.

Figure 8 is a plan view of the attaching yoke which is employed to cooperate with the base as a securing means for applying the lock device to a part of the bicycle when it is employed for bicycle use.

Figure 9 is a cross sectional view taken on the line 9—9 of Figure 8, looking in the direction of the arrow, partly broken away.

Figure 10 is a side view of the yoke member of Figures 8 and 9, about one half of the member being illustrated in section.

Figure 11 is a longitudinal sectional view through the lock and base as when the parts are adjusted according to the positions of Figure 1, namely, with the lock member in locking position, and bringing out the swivel or rotative connection between the lock member and the base.

Figure 12 is a sectional view through the base of the lock taken on the line 12—12 of Figure 11, and bringing out more clearly the arrangement of the two series of concentric tumblers with their spring actuating means, the locking member shown in section with the key in place as when operating certain tumblers. This illustrates certain cylinders actuated by the key to assume unlocked condition.

Figure 13 is a perspective view of the front end portion only of a bicycle, the frame parts being broken away, the lock device of the invention mounted in place on one of the front wheel fork members, this view showing how the lock member may be employed independently of the use of the chain, as when there is no post or similar object available for anchoring the bicycle permanently where it is left.

Referring to Figures 1 to 3 of the drawings, it is noted that my lock device, when availing of all parts employed for the purpose of use of the device for locking bicycles comprises the locking member 1, the base 2, and the attaching yoke 3 which is of somewhat U-form in side view. These parts are assembled in the following manner. In applying the device to the fork 4 of a bicycle as illustrated in Figure 13, the yoke or attaching member 3 is arranged so as to receive the fork between the sides thereof. The base, as shown in Figure 4, is equipped with openings 5 adapted to receive the approximately circular side members 3a of the yoke. These members 3a are provided with internal screw threads 6 to receive screws 7 illustrated in dotted lines in Figure 1. The screws 7 may be introduced into the threaded openings 6 by being passed through openings 8 formed in the locking member, which openings 8 register with the threaded openings 6 and the screws 7 when the locking member is in the unlocked position of Figure 3. Said openings 8 are out of register with said parts when the locking member 1 is in the locking position of Figure 2. Thus it is that the screws 7 are only accessible when the member 1 is in the unlocked position of Figure 3, and when the member 1 is in the position of Figure 2, the screws 7 cannot be tampered with or removed so as to enable their corresponding removal and possible stealing of the lock device by detachment of the yoke 3.

As shown in Figures 4 to 7 inclusive, the base 2 is of somewhat oval or elongated formation, and the larger end portion of the locking member 1 is similarly contoured so as to lie completely covering the base member 2 when the locking member 1 is in its locking position. On the other hand, by reason of the said contours of the base 2 and locking member 1, when the locking member 1 is in its unlocking position, the end portion 2a of the base 2 is uncovered, see Figures 3 and 7 for illustration.

With the foregoing in view, it will be noted that the base 2 is equipped at the end portion 2a with a vertical chain attaching engaging means, lug or stud 9, and a post encircling chain 10 comprising a linkage structure is adapted to have its end links engaged over the chain lug 9 after the manner illustrated in Figures 1 to 3 inclusive, after said chain 10 has been passed around a post, pillar, or any similar part. Indeed, the anchoring member or chain 10 may be passed around a horizontal part instead of a vertical post or the like, within the purview of the invention. By reason of the location of the chain lug 9 in the manner described, it will be apparent, by reference to Figures 3 and 7, that the locking member 1 is turned to its unlocking position, in which it is disposed transversely to the longitudinal axis of the base 2, the larger or rounded end of the locking member has uncovered the lug 9 and enables the chain 10 to be detached therefrom. When the locking member is in the position of Figures 1, 2, and 6, on the contrary, the larger end of said locking member extends over the lug 9 and prevents detachment of the chain 10 therefrom.

From the foregoing it is evident that the locking member 1 is turnable or rotative upon the base 2 and to enable the rotative or relative swivelling movement of said parts, I provide a connecting pin or post 11, which comprises the head 11a and enlarged bearing portion 11b having a bearing in a central opening of the locking member 1, a reduced bearing portion 11c having a bearing in a hollow trunnion or sleeve extension 2b projecting upwardly from the base 2. The lower or smaller end of the pin or post 11 may have a pressed, serrated, or interlocking engagement with the body portion of the base 2, being roughened or serrated at 11d for such purpose. The parts 11d may be connected by a shrink fit to the base 2, or the lower end of the member 11 may be upset to establish a permanent connection between the parts 1 and 2, if desired.

The head 11a is adapted to be largely received in a recess 12 in the upper surface of the locking member 1, and located in said recess is a coiled spring 13 interposed between a shoulder of the locking member 1 and the head 11a.

The spring 13 permits a slight degree of movement of the locking member 1 relatively to the member 2 at a right angle to the plane of the relative swivelling or rotative movement. This permits free rotation of the parts 1 and 2 relatively, but nevertheless maintains the same in close working contact.

The foregoing sets forth the general construction and arrangement of the parts of the locking device of the invention. Now there may be used with the locking device different kinds of lock mechanisms, but I prefer to employ lock mechanisms of a key-operated type comprising concentric tumbler or cylinder units of the class described and shown in my Letters Patent No. 1,390,222, issued September 26, 1921, also my Letters Patent No. 1,597,560 issued August 24, 1926. However, it will be understood that different types of lock mechanism units may be employed for the purposes of my invention, because I do not wish to be limited to the special type of units set forth in the Letters Patent to which I have just above referred.

Before referring more fully to the lock mechanism units utilized by me, it is noted that the base member 2 is equipped with an upstanding stop 14 which is adapted to operate in an arc-shaped cavity 15 formed in the locking member 1. The opposite ends of this cavity 15 are adapted to abut with the stop 14 and thus limit the turning movement of the locking member 1 relatively to the base 2 to a range permitting the shifting of the member 1 to its locking and unlocking positions, the member 1, of course, being re-locked in its extreme unlocking position.

The base 2 is equipped with two tumbler chambers 16 and 17, see Figure 4. In these tumbler chambers are disposed, as shown in Figure 12, the two series of concentric tumbler members each comprising concentric sleeves or cylinders 18 and a centerpin 19. Springs 20 tend to press the members 18 outwardly, and a spring 21 for each member 19 tends to press it outwardly. The two lock mechanism units comprising the parts 18, 19, 20 and 21 are disposed at opposite points transversely of the base 2 in the chambers 16 and 17, as previously stated.

The lock member 1 is equipped, as shown in Figure 5, with a lock mechanism unit comprising concentric tumblers of cylinder of sleeve form, designated 22, and the centerpin member 23, which are key-operable and disposed in a suitable chamber 24 consisting merely of a cylindrical opening in the locking member 1, extending from the flat or inner surface of said lock member.

Extending from the outer surface of the locking member 1 is a key opening or slot 25, see Figure 7, into which a key may be introduced for the purpose of operating the tumblers 22 and 23 to actuate said tumblers to cause their inner ends to occupy a plane of cleavage in relation to the tumblers in either of the chambers 16 and 17, which plane of cleavage coincides with the plane of separation between the parts 1 and 2. In this manner actuation of the tumblers 22 and 23 of the locking member 1, by a key, substantially as described in my previous patents above identified, will cause the parts of the locking mechanism unit in the chamber 24, and the corresponding parts of the units in either of the chambers 16 and 17, to assume positions unlocking the member 1 relatively to the base 2 and permitting it to rotate.

When the locking member is in the position shown in Figure 2, for instance, that is its locking or operating position, the chain 10, if it be used, is locked against displacement and the member 1 is interengaged with the spokes 26 of the wheel 27, see Figure 13, to lock the latter. In this same position the parts 22 and 23 of the locking mechanism of the locking member 1 cooperate with the tumbler parts in the chamber 17 of the base to maintain the member 1 locked until the introduction of a key into the slot or opening 25 to perform the unlocking action. When the locking member 1 is in the position of Figure 3, however, the tumblers 22 and 23 of the lock must cooperate with the tumblers in the chamber 16 of the base 2 and maintain the member 1 locked in said position of Figure 3 until the introduction of a key into the opening 25 and proper pressure thereon performs the unlocking action to render the member 1 free to turn on its post or pin 11.

It is obvious that during the movement of the member 1 from its locking to its unlocking position, and the reverse movement, some instrumentality must be employed to prevent the tumbler parts in the chambers 16 and 17 from being pushed out of the chambers by their springs as the corresponding parts 22 and 23 are being shifted to cooperate with either one of the sets of tumbler parts in the chambers 16 and 17. For this purpose, the locking member which is equipped on its underside with a bridge piece 28 that rides over the opening of the chamber 16 as the lock member 1 is swung from the locking position to its unlocking position, and moved reversely. In like manner, a portion of the metal structure on the under-side of the locking member 1 is adapted to operate over the tumbler parts in the chamber 17 of the base 2 to prevent said parts from being projected from the chamber during movement of the member 1 to and from its locking position.

It will be apparent from the foregoing that whether the locking member 1 is in the position of Figures 2 and 6, or in the position of Figures 3 and 7, it will become automatically locked as soon as it assumes such positions, and remains so locked until unlocked by the key member that may be introduced into the opening 25 for the purpose of unlocking the member 1 for manipulation thereof in a rotative manner to place the same in either one of its extreme positions for locking or unlocking action, as the case may be.

In Figure 13 the lock device of the invention is illustrated as being used without a chain. According to its action, the wheel 27 is locked. If the chain 10 is applied to the lock device as disposed in Figure 2, such chain may be caused to encircle some object of anchorage and prevent the bicycle from being removed therefrom.

It is also notable that when the lock member 1 is in a position intermediate the locking position of Figure 6 and the unlocked position of Figure 7, so that the tumblers in the chamber 24 are not in full cooperation with the tumblers in either of the chambers 16 and 17, the locking member adapted to be snapped into either locked positions of locked or unlocked adjustment. In other words, should the user prefer to temporarily maintain the locking member in a condition such that he can quickly shift it to its locking or unlocked adjustments, without the use of the key shown in Figure 14, said intermediate adjustment or position of the locking member 1 may be resorted to and the advantages of a snap lock obtained under these conditions.

The double acting function of the locking member 1 affords a dual purpose lock device for my invention in that the locking member may be utilized in conjunction with a chain 10 or the like, for attaching the bicycle to an anchorage means, or for performing its function as a wheel lock, or for both purposes at the same time.

It is to be understood that disregarding the function of the locking member 1 in reference to its extending end or locking extension, the invention may be employed as a chain lock to be permanently attached to a wall or other support to which a tire, a bicycle, or articles displayed, for instance exterior to a store, may be quickly locked by means of the chain 10, or an equivalent member.

It is to be understood that the shape of the member 1 and associated parts may be modified to give the same different appearances of a more or less artistic or ornamental nature, notwithstanding that the mechanical operation of the parts of the locking device will be as hereinbefore set forth.

The lock member 1 may be locked in locking position with the front fork and wheel of the bicycle at an angle and with chain 10 looped around or through the sprocket or pedal crank, thus making it very difficult to wheel the bicycle away in such condition.

Having thus described my invention, what I claim as new and desire to secure by Letters Patent of the United States, is:

1. In a lock device, in combination, a base, a locking member rotatively connected to the base, the base being equipped with an engaging lug for locking an anchoring member to the base, the locking member at one end being adapted to cooperate with said engaging lug to cover same, under which conditions the locking member has a locking effect over said engaging lug, the locking member at the other end projecting from the base to provide a locking extension, and lock mechanism intermediate the locking member and base for holding the locking member in a position in which its locking extension at one end, and its opposite end, perform their locking functions, the said locking member being shiftable rotatively on the base to assume an unlocking position.

2. In a lock device, in combination, a base equipped with a locking stud, a locking member mounted on said base, a member rotatively connecting the locking member intermediate its ends to the base, said locking member at one end adapted to engage over said locking stud and at its opposite end adapted to project from the base to form a locking extension when the locking member is in its locking position, an anchoring chain having its ends engaging over said stud and removable therefrom when the locking member is out of cooperation with the stud, and lock mechanism intermediate the base and locking member for holding the locking member in locking position and releasable to permit shifting of the locking member out of cooperation with said stud to assume an unlocking position, said lock mechanism coacting between the base and locking member to lock the latter in both unlocking position and locked position.

3. A lock device, in combination, a base, a locking member pivotally mounted on said base to rotate relatively thereto to assume locking and unlocking positions, lock mechanism intermediate the base and locking member comprising separate tumbler units on the base, one for locking the locking member in its locking position and the other for locking said locking member in its unlocked position, a tumbler unit on the locking member adapted to cooperate with either one of the tumbler units carried by the base so that the latter may perform their locking functions for holding the locking member in either of the positions specified above, said tumbler units being disposed with their axes parallel with the pivotal axis of the locking member, the locking member being provided with a key opening opposite the tumbler unit carried thereby and shiftable with the locking member for enabling the key to operate either of the tumbler units carried by the base when the tumbler unit of the locking member is in cooperation with either one of the tumbler units of the base.

SOLOMON WISE.